(12) United States Patent
Ji et al.

(10) Patent No.: US 10,275,639 B2
(45) Date of Patent: *Apr. 30, 2019

(54) FACE DETECTING AND TRACKING METHOD, METHOD FOR CONTROLLING ROTATION OF ROBOT HEAD AND ROBOT

(71) Applicant: UBTECH Robotics Corp., Shenzhen (CN)

(72) Inventors: Yuan Ji, Shenzhen (CN); Youjun Xiong, Shenzhen (CN)

(73) Assignee: UBTECH ROBOTICS CORP., Shenzhen (CN)

(*) Notice: Subject to any disclaimer, the term of this patent is extended or adjusted under 35 U.S.C. 154(b) by 121 days.

This patent is subject to a terminal disclaimer.

(21) Appl. No.: 15/356,789

(22) Filed: Nov. 21, 2016

(65) Prior Publication Data

US 2018/0012065 A1 Jan. 11, 2018

(30) Foreign Application Priority Data

Jul. 8, 2016 (CN) .......................... 2016 1 0539480

(51) Int. Cl.
*G06K 9/36* (2006.01)
*G06K 9/00* (2006.01)
*G05B 19/406* (2006.01)
*G06T 1/00* (2006.01)

(52) U.S. Cl.
CPC ....... *G06K 9/00228* (2013.01); *G05B 19/406* (2013.01); *G06T 1/0014* (2013.01); *G05B 2219/33113* (2013.01)

(58) Field of Classification Search
CPC ... G06K 9/00228–9/00261; G06K 2009/3291; G06T 1/0014; G06T 2207/30201; H04N 5/23219; Y10S 901/47
See application file for complete search history.

(56) References Cited

U.S. PATENT DOCUMENTS

| 2008/0187173 | A1* | 8/2008 | Kim .................. G06K 9/00234 382/103 |
| 2012/0235901 | A1* | 9/2012 | Binder ................. G01S 3/7864 345/156 |
| 2015/0086075 | A1* | 3/2015 | Shaick ............... G06K 9/00295 382/103 |

FOREIGN PATENT DOCUMENTS

| CN | 101196997 A | 6/2008 |
| CN | 102592147 A | 7/2012 |
| CN | 104021571 A | 9/2014 |
| JP | A2010021943 | 1/2010 |
| JP | A2015132955 | 7/2015 |

* cited by examiner

*Primary Examiner* — Brian Werner (57) ABSTRACT

A face detecting and tracking method includes: acquiring an image and performing a face detection to determine one or more face boxes of each acquired image; performing a detection error removing process to the image of current frame, and saving one of the one or more face boxes of the processed image of current frame as a first face box; and determining a tracking box of the image of current frame based on the first face box and a tracked face box, and tracking the face in the tracking box of the image of current frame.

9 Claims, 5 Drawing Sheets

FACE DETECTING AND TRACKING METHOD, METHOD FOR CONTROLLING ROTATION OF ROBOT HEAD AND ROBOT

CROSS REFERENCE TO RELATED APPLICATIONS

This application claims priority to Chinese Patent Application. No. 201610539480.8, filed Jul. 8, 2016, which is hereby incorporated by reference herein as if set forth in its entirety.

BACKGROUND

1. Technical Field

The present disclosure generally relates to human face recognition technology, and particularly to a human face detecting and tracking method, a method for controlling rotation of a robot head and a robot.

2. Description of Related Art

As computer vision technology becomes mature, it has been widely used in daily lives. For example, it can be used to control a robot and enables the robot to have visual function, thereby performing various detecting, determining, recognizing and measuring operations. Some conventional robots are equipped with a camera and are able to detect human faces in the images captured by the camera using face detecting technology, and track a detected human face, causing head of the robots to rotate as the human face moves. Some of the conventional human face detecting and tracking methods have high detection errors, which may tend to recognize non-human faces as human faces. Because of the high detection errors, the control of the rotation process of the robot heads is not accurate when controlling the robot heads to rotate using the conventional human face detecting and tracking methods.

SUMMARY

A face detecting and tracking method includes: acquiring an image and performing a face detection to determine one or more face boxes of each acquired image; performing a detection error removing process to the image of current frame, and saving one of the one or more face boxes of the processed image of current frame as a first face box; and determining a tracking box of the image of current frame based on the first face box and a tracked face box, and tracking the face in the tracking box of the image of current frame.

A method for controlling rotation of a robot head includes: determining a tracking box of a first image using the above face detecting and tracking method; determining if the tracking box of the first image is located at a central area of the first image; and if no, controlling a robot head to rotate until a tracking box of a second image captured after the first image is located at a central area of the second image.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Embodiment 1

Figure 1:
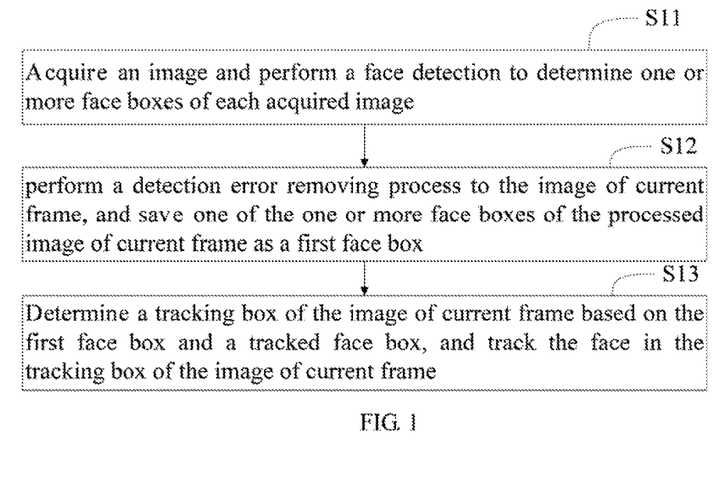
FIG. 1 is a flow chart of a face detecting and tracking method according to embodiment 1.
Figure 2:
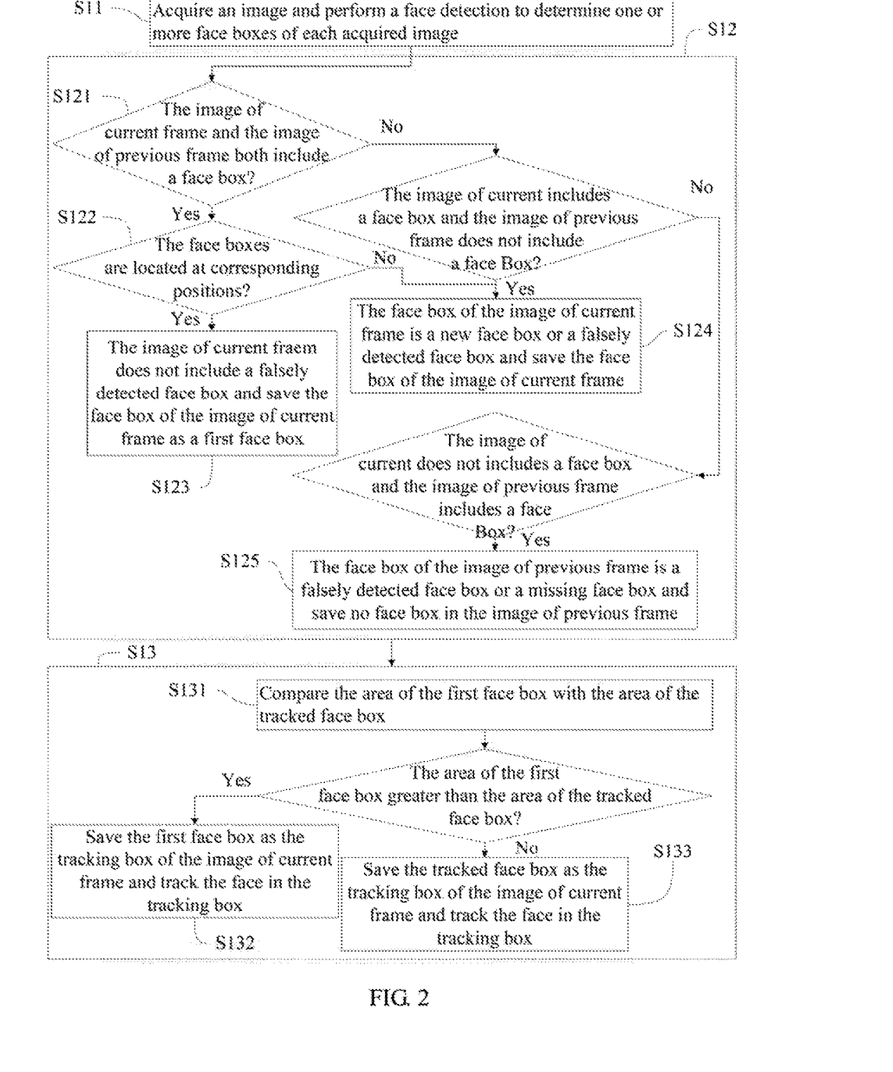
FIG. 2 is another flow chart of a face detecting and tracking method according to embodiment 1.

FIGS. 1 and 2 show flow charts of a human face detecting and tracking method according to one embodiment. The method includes the following steps:

Step S11: acquiring an image and performing a face detection to determine one or more face boxes of each acquired image. In the embodiment, Viola-Jones face detection algorithm is used for face detection in each image. Viola-Jones face detection algorithm extract image feature values using integral images, which increase the face detection speed to some extent. Viola-Jones face detection algorithm also uses Adaboost classifier for feature screening, and preserves the most useful features, which lowers the computation complexity during the face detection and increase the face detection speed. In addition, Viola-Jones face detection algorithm has modified the Adaboost classifier into a cascade Adaboost classifier to increase the face detection accuracy. It can be understood that other algorithms may be used to perform the face detection except for Viola-Jones face detection algorithm.

Step S12: performing a detection error removing process to the image of current frame, and saving one of the one or more face boxes of the processed image of current frame as a first face box. In the embodiment, the first face box is one of the one or more face boxes that has the maximum area. Each face box is rectangular and the area of each face box is the product of its length and its width. The step S12 can remove a falsely detected face box, which can increase face detection accuracy. As shown in FIG. 2, the step S12 includes:

Step S121: determining if an image of previous frame, which the image of current frame is successive to, and the image of current frame include one or more face boxes. The step S11 can determine one or more face boxes in each image. By determining if an image of previous frame and the image of current frame include one or more face boxes, it can determine if both of two successive images include one or more face boxes, so that it can determine if a falsely detected face box exists.

Step S122: if the image of previous frame and the image of current frame both include one or more face boxes, determining if the one or more face boxes of the image of current frame and the one or more face boxes of the image of previous frame are located at corresponding positions. In the embodiment, each face box is rectangular and the area of each face box is the product of its length and its width. In a coordinate system whose origin is located at the left corner of each image and having an X axis and a Y axis respectively extending along the lengthwise direction and the widthwise direction of the image, the center, the width and the height of each face box of each image can be used to determine the boundary of the face box. The step S122 includes:

S1211: determining, when the image of current frame and the image of previous frame are orientated in the same way in the same coordinate system, if overlapping portions exist between the one or more face boxes of the image of current frame and the one or more face boxes of the image of previous frame. In the embodiment, the image of current frame and the image of previous frame needs to be placed in the same coordinate system with their lower left corners coinciding with the origin of the system and their left sides and their lower sides residing at the Y axis and X axis of the coordinate system. The position of the center of each face box of each image in the coordinate system can be determined and the area surrounded by the boundary of each face box can be determined. Each face box in the image of current frame can then be compared with all the face boxes in the image of previous frame, to determine if each face box in the image of current frame overlaps with a corresponding face box in the image of previous frame.

Step S1222: if the overlapping portions exist, computing a first overlapping rate of an area of the overlapping portions to an area of the one or more face boxes of the image of current frame, and computing a second overlapping rate of an area of the overlapping portions to an area of the one or more face boxes of the image of previous frame.

Step S1223: determining if each of the first overlapping rate and the second overlapping rate is greater than a predetermined value.

Step S1224: if the first overlapping rate is greater than the predetermined value, and/or the second overlapping rate is greater than the predetermined value, the one or more face boxes of the image of current frame and the one or more face boxes of the image of previous frame are located at corresponding positions. Since a face box in the image of current frame and a corresponding face box in the image of previous frame may have different areas, the first overlapping rate and the second overlapping rate may be different. In the embodiment, each of the first overlapping rate and the second overlapping rate is greater than the predetermined value, then the one or more face boxes of the image of current frame and the one or more face boxes of the image of previous frame are considered to be located at corresponding positions.

Step S123: if the one or more face boxes of the image of current frame and the one or more face boxes of the image of previous frame are located at corresponding positions, determining that the image of current frame does not include a falsely detected face box, and save one of the one or more face boxes of the image of current frame as the first face box. The first face box is a face box that is detected after removing detection errors. If the image of current frame and the image of previous frame both include one or more face boxes at corresponding positions, i.e., the two successive images include one or more face boxes at corresponding positions, it means that the possibility that the image of current frame include falsely detected face box is low. One of the one or more face boxes in the image of current frame is considered to be the first face box. In the embodiment, if two successive images both include a face box at corresponding positions, the face box in the image of current frame is then determined to be the first face box. The face boxes that are not included in both of the image of current frame and the image of previous frame, and the face boxes in each of the current image do not have corresponding face boxes located at corresponding positions in the image of previous frame, are excluded from being the first face box, which reduces detection error and increase detection accuracy.

Step S124: if the one or more face boxes of the image of current frame and the one or more face boxes of the image of previous frame are not located at corresponding positions, or the image of previous frame does not comprise a face box, the one or more face boxes in the image of current frame are new face boxes or falsely detected face boxes, and save the one or more face boxes in the image of current frame. The image of current frame can then be compared with an image of next frame. However, the one or more face boxes of the current frame are not saved as the first face box.

Step S125: if the image of current frame does not include a face box and the image of previous frame includes a face box, then the face box in the image of previous frame is a falsely detected face box or a missing face box and save no face box in the image of previous frame, thereby removing false detection.

The step of performing a detection error removing process determines if two successive images i.e. the image of current frame and the image of previous frame include a face box in corresponding positions, to remove a falsely detected face box. It can be understood that a face box in the image of current frame and a corresponding face box in the image of previous image may vary slightly in position and size. It may affect the face detection accuracy if a face box in the image of current frame is considered as the first face box without detection error removing. Therefore, there is a step of performing a dithering removing process after the step of performing a detection error removing process. That is, by performing a dithering removing process to one or more face boxes in the image of current frame and the image of previous frame and saving a processed face box as the first face box, the position dithering of the image of current frame and the image of previous frame is thus removed, which guarantees the face detection accuracy.

Specifically, the step of performing dithering removing process includes: computing an average value of each of a center, a width and a height of each of the one or more face boxes of the image of current frame and a center, a width and a height of its corresponding face box of the image of previous frame; and determining the one of the one or more face boxes that is saved as the first face box according to the computed average values of the center, the width and the height. That is, seeking an average value of each of a center, a width and a height of each of the one or more face boxes of the image of current frame and the image of previous frame, to obtain the average values of the center, the width and the height of the face boxes in the two successive images. The obtained average values can fee used to determine a face box without position dithering and the face box is saved as the first face box. It is noted that an average value of a center of a face box of the image of current frame and a center of its corresponding face box of the image of previous frame means that coordinates $(x_{avg}, y_{avg})$ are determined by the coordinates (x1, y1) of the center of the face box of the image of current frame and the coordinates (x2, y2) of the center of the corresponding face box of the image of previous frame. That is, $x_{avg}$ equals to the average value of x1 and x2, and $y_{avg}$ equals to the average value of y1 and y2.

Step S13: determining a tracking box of the image of current frame based on the first face box and a tracked face box, and tracking the face in the tracking box of the image of current frame. The traced face box is a face area that is tracked in the image of current frame using a face tracking algorithm. The step S13 can avoid that the face detection results of several successive images are incontinuous when one of the images does not include a human face. In the embodiment, the face tracking algorithm can include, but is not limited to, Camshift algorithm. Camshift algorithm determines a face box traced in an image of previous frame to be the tracked face box in an image that is successive to the image of previous frame, and extracts position information of the traced face box. The position information includes the center, the width and the height of the tracked face box. In the embodiment, the tracked face box traced in the image of previous frame is compared with the first face box determined in the step S12 to determine the tracking box of the image of current frame, and track the face in the tracking box of the image of current frame. It can be understood that the tracking box of the image of previous frame may serve as the traced face box of the image of current frame. The step S13 includes:

Step S131: comparing an area of the first face box with an area of the tracked face box. The area of the first face box is the product of the width and the height of the first face box. The area of the tracked face box is the product of the width and the height of the tracked face box.

Step S132: if the area of the first face box is greater than or equal to the area of the tracked face box, determining that the first face box is the tracking box of the image of current frame, and tracking the face in the tracking box of the image of current frame. The first face box is determined to be the traced face box of the image of next frame. Camshift algorithm is used to track the face in the tracking box of the image of current frame.

Step S133: if the area of the first face box is less than the area of the tracked face box, determining that the tracked face box is the tracking box of the image of current frame, and tracking the face in the tracking box of the image of current frame. The tracked box is saved as the tracked box of the image of next frame. If the area of the first face box is less than the area of the tracked face box, the tracked face box is then determined to be the tracking box of the image of current frame.

The step S13 compares the area of the first face box with the area of the tracked face box, selects the face box having a maximum area as the tracking box of the image of current frame, and tracks the face in the tracking box of the image of current frame using Camshift algorithm. When the image of current frame includes several faces, it can increase the response efficiency rate by determining the face box having the maximum area to be the tracking box of the image of current frame to track the face in the tracking box of the image of current frame.

The face detecting and tracking method of the embodiment determines one or more face boxes of each image after performing a face detection to the captured images, and performs a detection error removing process to the image of current frame, which reduces detection error and increases the face detection accuracy. The method then determines the tracking box of the image of current frame and tracks the face in the tracking box, which can guarantee the continuity of the detected face. The method performs dithering removing process after performs a detection error removing process, to further increase the face detection accuracy.

Embodiment 2

Figure 3:
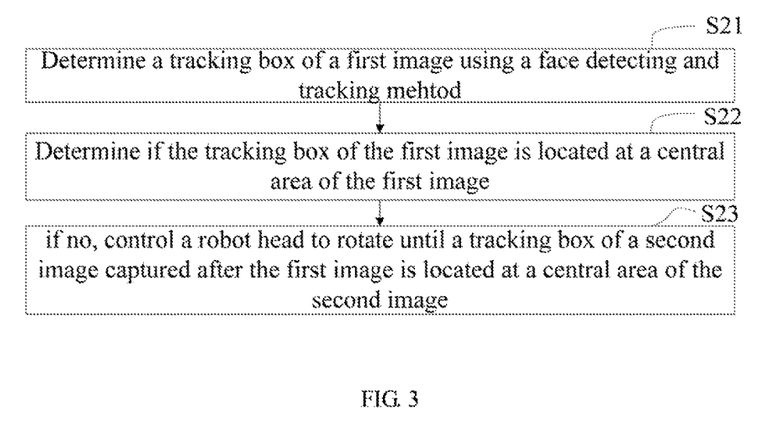
FIG. 3 is a flow chart of a method for controlling rotation of a robot head according to embodiment 2.

FIG. 3 shows a method for controlling rotation of a robot head according to one embodiment. The robot include a camera device for capturing images. The method includes:

Step S21: determining a tracking box of a first image using the method described in embodiment 1, and a center of the tracking box. The coordinates (x0, y0) of the center B of the tracking box of the first image are read in real-time. It can be understood that it can reduce detection error and increase face detection accuracy by performing a detection error removing process. Furthermore, the cooperation of the steps S11 and S13 can guarantee a smooth rotation of the robot head.

Figure 4:
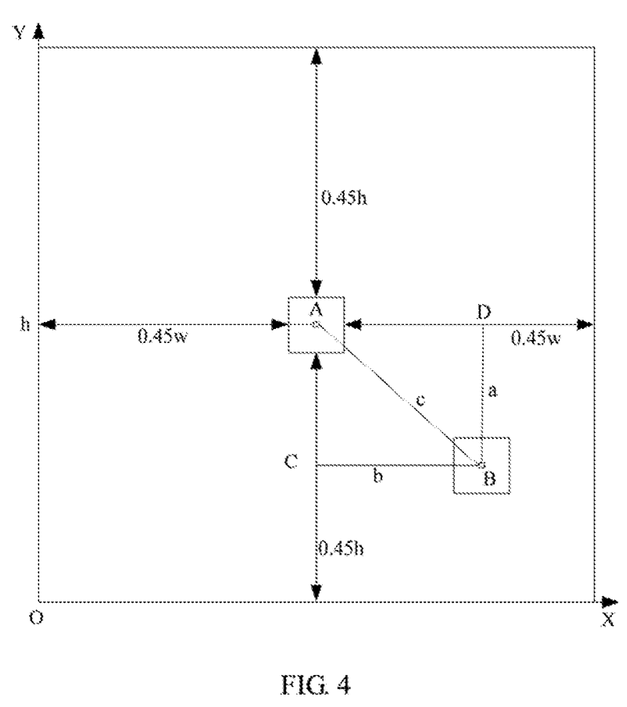
FIG. 4 is a schematic view showing a captured image of embodiment 2.

Step S22: determining if the tracking box of the first image is located at a central area of the first image. As shown in FIG. 4, the first image has a width w and a height h, and a coordinate system OXY is established with the lower left corner of the first image being the origin. Assuming that the central area of the first image has a width of 0.1 w and a height of 0.1 h. The center of the central area coincides with the center of the first image. Thus, the coordinates of center A of the central area are (0.5 w, 0.5 h). The coordinates of the lower left corner, upper left corner, lower right corner, and upper right corner of the central area are (0.45 w, 0.45 h), (0.45 w, 0.45 h), (0.55 w, 0.45 h), and (0.55 w, 0.55 h). Each pixel in the central area has a horizontal coordinate greater than 0.45 w and smaller than 0.55 w, and a vertical coordinate greater than 0.45 h and smaller than 0.55 h. In the embodiment, the coordinates of the center A of the central area are compared with the coordinates (x0, y0) of the center B of the tracking box of the first image, and the tracking box of the first image is determined to be located at a central area of the first image if the coordinates of the centers A and B are the same. In another embodiment, the tracking box of the first image is determined to be located at a central area of the first image if the coordinates of center B is located within the central area of the first image.

Step S23: if the tracking box of the first image is not located at a central area of the first image, controlling the robot head to rotate until a tracking box of a second image captured after the first image is located at a central area of the second image, thereby realizing that the robot head rotates as the tracked face moves. In the embodiment, the camera device of the robot is arranged in the robot head. The robot captures images with the camera device and can recognize one or more human faces in the captured images. The robot can select a face from the recognized faces to track. When the tracking box marking the tracked face in an image, such as the first image, is not located at a central area of the image, the robot will rotate its head from a first position to a second position. The robot head at the second position then captures an image (i.e., the second image) and determines if the tracking box in the second image is located at a central area of the second image using the steps S21 and S22. The robot stops rotating its head if the tracking box in the second image is located at a central area of the second image. It is noted that the "first" and the "second" herein are used to differentiate two images from each other and do not mean that the second image is necessarily successive to the first image.

Step S23 includes the following steps: computing a horizontal offset angle and a vertical offset angle of the center of the central area of the first image relative to the center of the tracking box of the first image, and controlling the robot head to horizontally rotate for the horizontal offset angle and to vertically rotate for the vertical offset angle, to cause a center of the central area of the second image to coincide with a center of the tracking box of the second image, to cause the center of the central area to coincide with the center of the tracking box.

As shown in FIG. 4, the horizontal angle is $\angle ABD$ and the vertical angle is $\angle ABC$. The coordinates of the centers A and B are (0.5 w, 0.5 h) and (x0, y0), then $BD=AC=a=|0.5 h-y0|$, $BC=AD=b=|0.5 w-x0|$, and $AB=c=\sqrt{a^2+b^2}$. According to the Law of Cosines, $$\cos\angle ABD = \frac{BD}{AB} = \frac{a}{c},$$

and the horizontal angle $$\angle ABD = \arccos\frac{a}{c}.$$

Similarly, $$\cos\angle ABD = \frac{BC}{AB} = \frac{b}{c},$$

and the vertical angle $$\angle ABC = \arccos\frac{b}{c}.$$

After the robot head has horizontally rotated for the horizontal offset angle $\angle ABD$ and vertically rotated for the vertical offset angle $\angle ABC$, the center of the central area of the second image coincides with the center of the tracking box of the second image, realizing that the robot head rotates as the tracked human face moves. The robot can thus show some kind of lifelikeness.

In another embodiment, Step S23 may include the following steps: controlling the robot head to horizontally and vertically rotate to cause the center of the tracking box of the second image to be within the central area of the second area. Specifically, one or more images will be captured as the robot head rotates. The coordinates (x0, y0) of the center B of the tracking box of each of these images are read in real-time. If x0<0.45 w, the robot head is controlled to rotate left. If the x0>0.55 w, the robot head is controlled to rotate right. If y0<0.45 h, the robot head is controlled to rotate downward. If y0>0.45 h, the robot head is controlled to rotate upward. The robot head stops rotating when the tracked face is located at the center of one of these images. The above-mentioned steps need less computation and can realize a fast control.

The method of the present embodiment captures images using a built-in camera device, determines the tracking box of an image using face detection and tracking method, and controls a robot head to rotate until the tracking box of a captured image is located at a central area of the image. The method for controlling rotation of the robot head may control the robot head to rotate left/right and upward/downward based on the position of the tracking box and the central area of a captured image, which enable the robot to show some kind of lifelikeness during the rotation of the robot head. A smooth rotation of the robot head can be realized by using the human face detecting and tracking method to determine the tracking box of a captured image.

Figure 5:
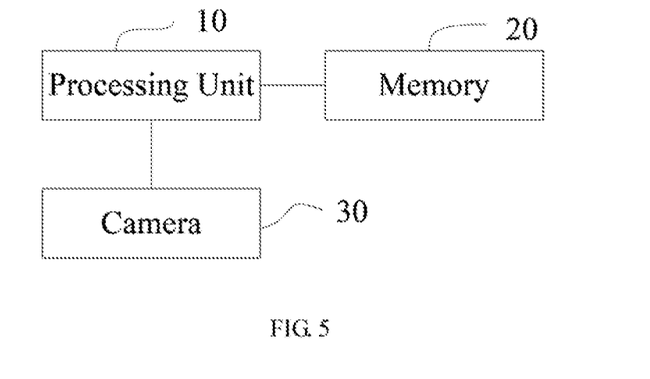
FIG. 5 is a schematic view of a block diagram of a robot.

As shown in FIG. 5, a robot implementing the methods described in the above embodiments includes a processing unit 10, a memory 20 and a camera 30. The processing unit 10 may be implemented as one or more hardware processors including, for example, a microprocessor, an application-specific instruction-set processor, a graphics processing unit, a physics processing unit (PPU), a central processing unit (CPU), a graphics processing unit (GPU), a digital signal processor, etc. The processing unit 10 is coupled to the memory 20 and the camera 30. The memory 20 stores executable instructions that, when executed by the processing unit 10, cause the processing unit 10 to perform acts including: controlling the camera 30 to acquire an image and performing a face detection to determine one or more face boxes of each acquired image; performing a detection error removing process to the image of current frame, and saving one of the one or more face boxes of the processed image of current frame as a first face box; and determining a tracking box of the image of current frame based on the first face box and a tracked face box, and tracking the face in the tracking box of the image of current frame. The acts may also include: determining if a tracking box of a first image is located at a central area of the first image; and if no, controlling a robot head to rotate until a tracking box of a second image captured after the first image is located at a central area of the second image.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A face detecting and tracking method comprising:
    acquiring an image and performing a face detection to determine one or more face boxes of each acquired image;
    performing a detection error removing process to the image of current frame, and saving one of the one or more face boxes of the processed image of current frame as a first face box; and
    determining a tracking box of the image of current frame based on the first face box and a tracked face box, and tracking a face in the tracking box of the image of current frame;
    wherein the step of performing a detection error removing process to the image of current frame, and saving one of the one or more face boxes of the processed image of current frame as a first face box, comprises:

determining that an image of previous frame, which the image of current frame is successive to, and the image of current frame comprise one or more face boxes;

determining that the one or more face boxes of the image of current frame and the one or more face boxes of the image of previous frame are located at corresponding positions; and determining that the image of current frame does not comprise a falsely detected face box, and saving one of the one or more face boxes of the image of current frame as the first face box;

wherein the step of determining if the one or more face boxes of the image of current frame and the one or more face boxes of the image of previous frame are located at corresponding positions, comprises:

determining that the image of current frame and the image of previous frame are orientated in the same way in the same coordinate system, and that overlapping portions exist between the one or more face boxes of the image of current frame and the one or more face boxes of the image of previous frame;

computing a first overlapping rate of an area of the overlapping portions to an area of the one or more face boxes of the image of current frame, and computing a second overlapping rate of an area of the overlapping portions to an area of the one or more face boxes of the image of previous frame;

in response to the first overlapping rate and/or the second overlapping rate being greater than a predetermined value, determining that the one or more face boxes of the image of current frame and the one or more face boxes of the image of previous frame are located at corresponding positions.

2. The method of claim 1, wherein the step of performing a detection error removing process to the image of current frame, and saving one of the one or more face boxes of the processed image of current frame as a first face box, comprises:

if the one or more face boxes of the image of current frame and the one or more face boxes of the image of previous frame are not located at corresponding positions, or the image of previous frame does not comprise a face box, the one or more face boxes in the image of current frame being new face boxes or falsely detected face boxes, and saving the one or more face boxes in the image of current frame;

if the image of current frame does not include a face box and the image of previous frame comprises one or more face boxes, the one or more face boxes in the image of previous frame are falsely detected face boxes or missing face boxes, and saving no face boxes in the image of previous frame.

3. The method of claim 1, further comprising, after the step of performing a detection error removing process to the image of current frame, performing a dithering removing process to the one or more face boxes of the image of current frame and the image of previous frame, and saving one of the processed one or more face boxes as the first face box.

4. The method of claim 3, wherein the step of performing a dithering removing process to the one or more face boxes of the image of current frame and the image of previous frame, comprises:

computing an average value of each of a center, a width and a height of each of the one or more face boxes of the image of current frame and a center, a width and a height of a corresponding face box of the image of previous frame; and determining the one of the one or more face boxes that is saved as the first face box according to the computed average values.

5. The method of claim 1, wherein the step of determining a tracking box of the image of current frame based on the first face box and a tracked face box, and tracking the face in the tracking box of the image of current frame, comprises:

comparing an area of the first face box with an area of the tracked face box;

if the area of the first face box is greater than or equal to the area of the tracked face box, determining that the first face box is the tracking box of the image of current frame, and tracking the face in the tracking box of the image of current frame; and if the area of the first face box is less than the area of the tracked face box, determining that the tracked face box is the tracking box of the image of current frame, and tracking the face in the tracking box of the image of current frame.

6. A method for controlling rotation of a robot head, comprising:

determining a tracking box of a first image using a face detecting and tracking method, wherein the face detecting and tracking method comprises:

acquiring an image and performing a face detection to determine one or more face boxes of each acquired image;

performing a detection error removing process to the image of current frame, and saving one of the one or more face boxes of the processed image of current frame as a first face box; and determining a tracking box of the image of current frame based on the first face box and a tracked face box, and tracking the face in the tracking box of the image of current frame;

determining if the tracking box of the first image is located at a central area of the first image; and if no, controlling a robot head to rotate until a tracking box of a second image captured after the first image is located at a central area of the second image;

wherein the step of performing a detection error removing process to the image of current frame, and saving one of the one or more face boxes of the processed image of current frame as a first face box, comprises:

determining that an image of previous frame, which the image of current frame is successive to, and the image of current frame comprise one or more face boxes;

determining that the one or more face boxes of the image of current frame and the one or more face boxes of the image of previous frame are located at corresponding positions; and determining that the image of current frame does not comprise a falsely detected face box, and saving one of the one or more face boxes of the image of current frame as the first face box;

wherein the step of determining if the one or more face boxes of the image of current frame and the one or more face boxes of the image of previous frame are located at corresponding positions, comprises:

determining that the image of current frame and the image of previous frame are orientated in the same way in the same coordinate system, and that overlapping portions exist between the one or more face boxes of the image of current frame and the one or more face boxes of the image of previous frame;

computing a first overlapping rate of an area of the overlapping portions to an area of the one or more face boxes of the image of current frame, and computing a second overlapping rate of an area of the overlapping portions to an area of the one or more face boxes of the image of previous frame;

in response to the first overlapping rate and/or the second overlapping rate being greater than a predetermined value, determining that the one or more face boxes of the image of current frame and the one or more face boxes of the image of previous frame are located at corresponding positions.

7. The method of claim 6, wherein the step of controlling a robot head to rotate until a tracking box of a second image captured after the first image is located at a central area of the second image, comprises:

computing a horizontal offset angle and a vertical offset angle of a center of the central area of the first image relative to a center of the tracking box of the first image; and controlling the robot head to horizontally rotate for the horizontal offset angle and to vertically rotate for the vertical offset angle, to cause a center of the central area of the second image to coincide with a center of the tracking box of the second image.

8. The method of claim 6, wherein the step of controlling a robot head to rotate until a tracking box of a second image captured after the first image is located at a central area of the second image, comprises:

controlling the robot head to horizontally and vertically rotate to cause a center of the tracking box of the second image to be within a boundary of the central area of the second image.

9. A robot controlling rotation of a robot head using a method comprising:

determining a tracking box of a first image using a face detecting and tracking method, wherein the face detecting and tracking method comprising:

acquiring an image and performing a face detection to determine one or more face boxes of each acquired image;

performing a detection error removing process to the image of current frame, and saving one of the one or more face boxes of the processed image of current frame as a first face box; and determining a tracking box of the image of current frame based on the first face box and a tracked face box, and tracking the face in the tracking box of the image of current frame;

determining if the tracking box of the first image is located at a central area of the first image; and if no, controlling a robot head to rotate until a tracking box of a second image captured after the first image is located at a central area of the second image;

wherein the step of determining the tracking box of the image of current frame based on the first face box and the tracked face box, and tracking the face in the tracking box of the image of current frame, comprises:

comparing an area of the first face box with an area of the tracked face box;

if the area of the first face box is greater than or equal to the area of the tracked face box, determining that the first face box is the tracking box of the image of current frame, and tracking the face in the tracking box of the image of current frame; and if the area of the first face box is less than the area of the tracked face box, determining that the tracked face box is the tracking box of the image of current frame, and tracking the face in the tracking box of the image of current frame.

* * * * *